United States Patent
Yakushi

(10) Patent No.: US 7,000,893 B2
(45) Date of Patent: Feb. 21, 2006

(54) SERVO-VALVE CONTROL DEVICE AND SERVO-VALVE CONTROL SYSTEM WITH ABNORMALITY DETECTION

(75) Inventor: Koji Yakushi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 10/749,399

(22) Filed: Jan. 2, 2004

(65) Prior Publication Data

US 2004/0193327 A1    Sep. 30, 2004

(30) Foreign Application Priority Data

Jan. 9, 2003  (JP) ............................... 2003-002687

(51) Int. Cl.
*F16K 31/02* (2006.01)

(52) U.S. Cl. ................................... 251/129.04; 251/25

(58) Field of Classification Search .......... 251/129.04, 251/129.01, 25
See application file for complete search history.

(56) References Cited

U.S. PATENT DOCUMENTS

| | | | | |
|---|---|---|---|---|
| 3,699,989 A | * | 10/1972 | O'Connor et al. ..... | 251/129.04 |
| 4,017,056 A | * | 4/1977 | Schwalenstocker et al. ..... | 251/129.08 |
| 5,746,178 A | * | 5/1998 | Susaki et al. .......... | 251/129.04 |
| 5,992,383 A | * | 11/1999 | Scholten et al. ....... | 251/129.04 |
| 6,427,971 B1 | * | 8/2002 | Kawabe et al. ........ | 251/129.04 |
| 6,554,248 B1 | * | 4/2003 | Taniguchi et al. ..... | 251/129.04 |
| 6,810,906 B1 | * | 11/2004 | Tanaka et al. ......... | 251/129.04 |

FOREIGN PATENT DOCUMENTS

JP    4-228839    8/1992

* cited by examiner

*Primary Examiner*—John Bastianelli
(74) *Attorney, Agent, or Firm*—Oblon, Spivak, McClelland, Maier & Neustadt, P.C.

(57) ABSTRACT

A servo-valve control device for controlling servo-valve opening. The servo-valve opening follows a target by inputting signals of a servo-valve opening target value and of an actual servo-valve opening. The control device has a controller, which is constructed to receive a signal of difference between the servo-valve opening target value and the actual servo-valve opening, and to generate a servo command signal for driving the servo valve. The control device also has an extended observer, which is constructed to receive the actual valve opening signal and the servo command signal, and to estimate an input-terminal disturbance signal added on the servo valve. The control device also has a modification part, which is constructed to modify the servo command signal by subtracting the estimated input-terminal disturbance signal output from the extended observer, from the servo command signal.

16 Claims, 15 Drawing Sheets

SERVO-VALVE CONTROL DEVICE AND SERVO-VALVE CONTROL SYSTEM WITH ABNORMALITY DETECTION

CROSS-REFERENCE TO RELATED APPLICATIONS

This application is based upon and claims the benefits of priority from the prior Japanese Patent Application No. 2003-2687, filed on Jan. 9, 2003; the entire content of which is incorporated herein by reference.

BACKGROUND OF THE INVENTION

The present invention is related generally to a servo-valve control device and a servo-valve control system, and more specifically, to such a device and a system which can operate stably even when a disturbance has emerged at the input terminal of the servo valve.

Servo valves have been used for various purposes including turbine speed control devices in thermal power plants. As for a turbine speed control device, for example, as shown in FIG. 13, a turbine revolution speed $N_R$ and a command of turbine revolution speed Ns are input to a revolution speed controller 1. Generator load $G_L$ and load command Gs are input to the load controller 2, and command signal of flow rate of a main-steam control valve is calculated. The flow rate command signal is input to a flow-rate-to-valve-opening conversion function 3 for converting the flow rate command signal to a valve opening command signal 3e. Here, the expression of "valve opening" is interchangeably used as "valve position".

The valve opening command signal 3e and an actual valve opening signal 4e which has been detected by a valve-opening detector 4 are input to a servo-valve control device 5. The two signals 3e and 4e are compared in the servo-valve control device 5 and the difference is output to a solenoid (or servo coil) 7-1 of a servo valve 7 as a servo command signal 5e via a valve interface 6.

The servo coil 7-1 converts the servo command signal 5e into an oil pressure with an electric-to-oil-pressure converter (not shown). The converted oil pressure is transmitted into an oil cylinder, and a piston in the oil cylinder is moved to change the main-steam control valve opening.

FIG. 14 shows internal functions of a prior-art servo-valve control device 5. The servo-valve opening command signal 3e and the actual valve opening signal 4e are input to a summer 5-1 for outputting the difference. The difference is multiplied by a valve-position control gain in a power amplifier 5-2. Then, an output of a null bias compensator 5-3 is added to the output of the power amplifier 5-2 in a summer 5-4. The output of the summer 5-4 is, then, input to a limiter 5-5. The output of the limiter 5-5 is input to a valve interface 6 as a servo command signal 5e. The output of the valve interface 6 is input to a servo coil 7-1 so that the servo valve 7 is driven.

The null bias compensator 5-3 provides a bias for controlling the main-steam control valve to the fail-safe side or to the valve closing direction when the servo current to the servo coil 7-1 is lost. The limiter 5-5 is optionally disposed for limiting the servo command signal that is output of the controller.

FIG. 15 is a block diagram of a 3-coil servo system, which has a triplex structure of systems of A, B and C for a single main-steam control valve 8, in order to enhance reliability of the servo-valve control device 5. The triplex structure of systems of A, B and C includes servo-valve control devices, valve interfaces, servo coils and valve-opening detectors.

As shown in FIG. 15, outputs 4Ae, 4Be and 4Ce of valve-opening detectors 4A, 4B and 4C in the systems A, B and C, respectively, are all input to middle value gates 5-M in servo-valve control devices 5A, 5B and 5C. Each of the middle value gates 5-M outputs the middle value in the inputs. Then, the middle value is compared with the servo-valve opening command signal 3e, and the difference is output in the summer 5-1, as have been discussed referring to FIG. 14. The rest parts of the functions are same as that disclosed in FIG. 14, and not repeated here.

The outputs of the servo-valve control devices 5A, 5B and 5C are input to the middle value gates 6-1 of the valve interfaces 6A, 6B and 6C. The middle value gates 6-1 are of the same construction of the middle value gates 5-M described above, and the middle values are selected and output there. The outputs of the middle value gates 6-1 are amplified by the amplifiers 6-2 in the valve interfaces 6A, 6B and 6C.

In the 3-coil servo system shown here, the servo currents are directly detected by the servo-current detectors 7-2A, 7-2B and 7-2C disposed at the servo valves 7A, 7B and 7C, respectively, and are fed back. Thus, the abnormal condition in the valve interfaces 6A, 6B and 6C is detected from the servo current signals, and a circuit separation command is output to one of the circuit separation switches 6-3A, 6-3B and 6-3C. Thus, the abnormal valve interface is separated, as disclosed in Japanese Patent Application Publication. (Tokkai) Hei 4-228839.

In the servo-valve control device of the prior art such as that disclosed above, proportional control is used. In such a device, control deviation may be generated between the main-steam control valve opening command and the actual valve opening, due to mechanical null bias movement of the servo valves and various input terminal disturbances in the servo valve mechanisms. Such a control deviation may deteriorate the control performance of the servo-valve control device.

Therefore, null bias compensation value must be tuned periodically. Furthermore, if an input terminal disturbance to the servo valve has occurred in a 3-coil servo system, control deviation may be generated between the main-steam control valve opening command and the actual valve opening. The input terminal disturbance may include a one-system abnormality in the valve interfaces, and one-system or two-system disconnection of the servo coils. Such a control deviation may cause deterioration of the control performance of the servo-valve control device.

A typical approach to elimination of such control deviation is addition of an integration control. However, the servo valve, which is to be controlled, has a characteristics of integration in the relation between the control input (or the servo current) and the observation output (or the main-steam control valve position). Therefore, if an integrator is added to the controller side, the closed loop response would become slower, and the stability might deteriorate.

In the 3-coil servo system of the prior art described above, the servo current of each system is directly detected by its respective servo-current detector. Thus, the system is identified where the power-amplifier abnormality, servo-coil disconnection etc. has occurred. Then, the output from the abnormal system is separated, and normal control is continued. However, the servo-current detectors 7-2A, 7-2B and 7-2C and the circuit separation switches 6-3A, 6-3B or 6-3C are required for each system to be constructed, which results in high cost hardware. In addition, reliability of the total system is lowered, considering the failure of the servo-current detectors 7-2A, 7-2B and 7-2C and the circuit separation switches 6-3A, 6-3B and 6-3C.

BRIEF SUMMARY OF THE INVENTION

Accordingly, it is an object of the present invention to provide a servo-valve control device and a servo-control system which can normally control a servo valve without control deviation even when input terminal disturbance has emerged at the servo valve.

There has been provided, in accordance with an aspect of the present invention, a servo-valve control device for controlling servo-valve opening, so that the servo-valve opening may follow a target by inputting signals of a servo-valve opening target value and of an actual servo-valve opening, the control device comprising: a controller, which is constructed to receive a signal of difference between the servo-valve opening target value and the actual servo-valve opening, and to generate a servo command signal for driving the servo valve; an extended observer, which is constructed to receive the actual valve opening signal and the servo command signal, and to estimate an input-terminal disturbance signal added on the servo valve; and a modification part, which is constructed to modify the servo command signal by subtracting the estimated input-terminal disturbance signal output from the extended observer, from the servo command signal.

There has been provided, in accordance with another aspect of the present invention, a servo-valve control device for controlling servo-valve opening, so that the servo-valve opening may follow a target by inputting signals of a servo-valve opening target value and of an actual servo-valve opening, the control device comprising: a controller, which is constructed to receive a signal of difference between the servo-valve opening target value and the actual servo-valve opening, and to generate a servo command signal for driving the servo valve; an extended observer, which is constructed to receive the actual valve opening signal and the servo command signal, and to estimate an input-terminal disturbance signal added on the servo valve; and a function generator, which is constructed to tune at least one control parameter of the controller based upon the disturbance estimation signal from the extended observer.

There has been provided, in accordance with another aspect of the present invention, a servo-valve control device for controlling servo-valve opening, so that the servo-valve opening may follow a target by inputting signals of a servo-valve opening target value and of an actual servo-valve opening, the control device comprising: a controller, which is constructed to receive a signal of difference between the servo-valve opening target value and the actual servo-valve opening, and to generate a servo command signal for driving the servo valve; an extended observer, which is constructed to receive the actual valve opening signal and the servo command signal, and to estimate an input-terminal disturbance signal added on the servo valve; a null bias compensator which is constructed to add a compensation signal to the servo command signal for compensating a null bias contained in the servo valve; and a tuner for tuning at least one setting value of the null bias compensator, based upon the disturbance estimation signal from the extended observer.

There has been provided, in accordance with another aspect of the present invention, a servo-valve control system for controlling a servo valve, the control system comprising: (a) a triplex system of valve-opening detectors for obtaining actual valve opening signals of the servo valve; (b) a triplex system of servo-valve control devices each including: a first middle value gate for selecting a middle value of the actual valve opening signals of the servo valve; a controller, which is constructed to receive a signal of difference between the servo-valve opening target value and the middle value of the actual servo-valve opening, and to generate a servo command signal for driving the servo valve; an extended observer, which is constructed to receive the actual valve opening signal and the servo command signal, and to estimate an input-terminal disturbance signal added on the servo valve; and a modification part, which is constructed to modify the servo command signal by subtracting the estimated input-terminal disturbance signal output from the extended observer, from the servo command signal; (c) a triplex system of valve interfaces each including: a second middle value gate for selecting a middle value of the servo command signals from the servo-valve control devices; and a power amplifier which is constructed to amplify the servo command signal from the second middle value gate to drive one of the servo valves; and (d) a triplex system of servo coils for driving the servo valves with current from the valve interfaces.

There has been provided, in accordance with another aspect of the present invention, a servo-valve control system for controlling a servo valve, the control system comprising: (a) a triplex system of servo-valve control devices each including: a controller, which is constructed to receive a signal of difference between the servo-valve opening target value and the actual servo-valve opening, and to generate a servo command signal for driving the servo valve; an extended observer, which is constructed to receive the actual valve opening signal and the servo command signal, and to estimate an input-terminal disturbance signal added on the servo valve; and a modification part, which is constructed to modify the servo command signal by subtracting the estimated input-terminal disturbance signal output from the extended observer, from the servo command signal; (b) a triplex system of valve interfaces each including a power amplifier which is constructed to amplify one of the servo command signals from the servo-valve control devices to drive one of the servo valves; (c) a triplex system of servo coils for driving the servo valves with current from the valve interfaces; (d) an abnormality decision part for deciding that at least two valve interfaces are abnormal when all of the input-terminal disturbance signals are out of a pre-determined range; and (e) a detecting logic for separating outputs of the power amplifier sequentially, based upon operation of the abnormality decision part, and for subsequently detecting abnormal power amplifier system based upon change rate of the input-terminal disturbance signal output from the extended observer.

There has been provided, in accordance with another aspect of the present invention, a servo-valve control system for controlling a servo valve, the control system comprising: (a) a triplex system of servo-valve control devices each including: a controller, which is constructed to receive a signal of difference between the servo-valve opening target value and the actual servo-valve opening, and to generate a servo command signal for driving the servo valve; an extended observer, which is constructed to receive the actual valve opening signal and the servo command signal, and to estimate an input-terminal disturbance signal added on the servo valve; and a function generator, which is constructed to tune at least one control parameter of the controller based upon the disturbance estimation signal from the extended observer; (b) a triplex system of valve interfaces each including a power amplifier which is constructed to amplify one of the servo command signals from the servo-valve control devices to drive one of the servo valves; (c) a triplex system of servo coils for driving the servo valves with current from the valve interfaces; (d) an abnormality decision part for deciding that at least two valve interfaces are abnormal when all of the input-terminal disturbance signals are out of a pre-determined range; and (e) a detecting logic for separating outputs of the power amplifier sequentially, based upon operation of the abnormality decision part, and for subsequently detecting abnormal power amplifier system based upon change rate of the input-terminal disturbance signal output from the extended observer.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Now, specific embodiments of the present invention are described. In the description below, same or like parts are referred to like numerals, and redundant description is eliminated.

First Embodiment

Figure 1:
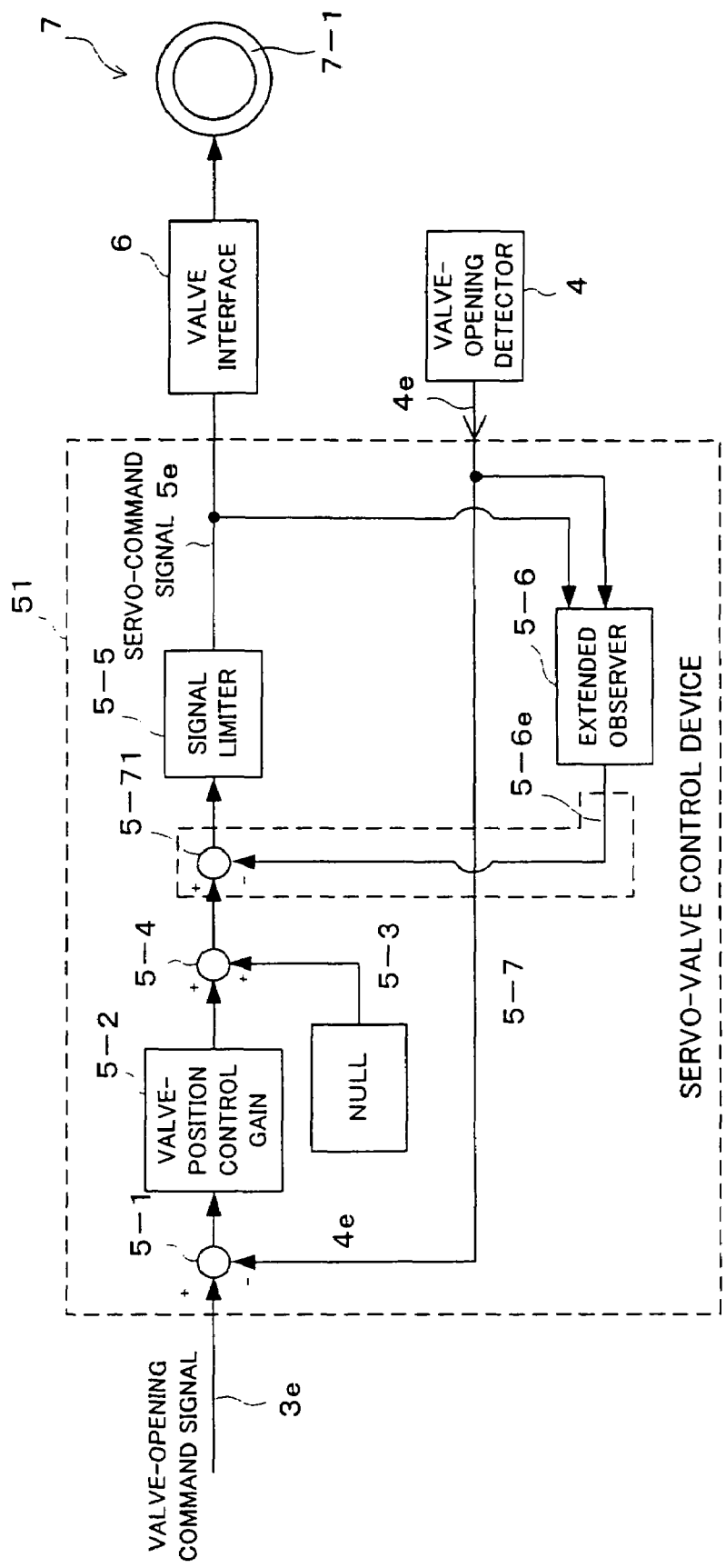
FIG. 1 is a block diagram of a servo-valve control device of a first embodiment according to the present invention.

FIG. 1 is a block diagram of a servo-valve control device of a first embodiment according to the present invention. The servo-valve control device 51 of this embodiment has a summer 5-1. The summer 5-1 compares the servo-valve opening command signal 3e and the actual valve opening signal 4e which has been detected by the valve-opening detector 4, and calculates the deviation. The servo-valve control device 51 also has a controller 5-2, which multiplies the deviation output of the summer 5-1 by a valve-position control gain. The servo-valve control device 51 also has a null bias compensator 5-3 for compensating mechanical null bias which the servo valve has. The servo-valve control device 51 also has a summer 5-4 for adding the output of the controller 5-2 and the output of the null bias compensator 5-3.

The servo-valve control device 51 may optionally have a limiter 5-5 for setting the upper and lower limits for the servo command signal. The limiter 5-5 may be connected downstream of the summer 5-4.

The servo-valve control device 51 also has an extended observer 5-6. The extended observer 5-6 receives the servo command signal 5e and the actual valve opening signal 4e as inputs, and estimates disturbance at the input terminal of the servo valve, based upon a mathematical model of the servo valve to be controlled. The servo-valve control device 51 also has a feed-forward pass (or modifying means) 5-7. The feed-forward pass 5-7 changes the sign of the disturbance estimation value 5-6e output from the extended observer 5-6, and adds it to the servo command signal output from the summer 5-4 to recalculate (or amend) the servo command signal. The numeral "5-71" shown in this figure is a summer in the feed-forward pass 5-7.

Figure 2:
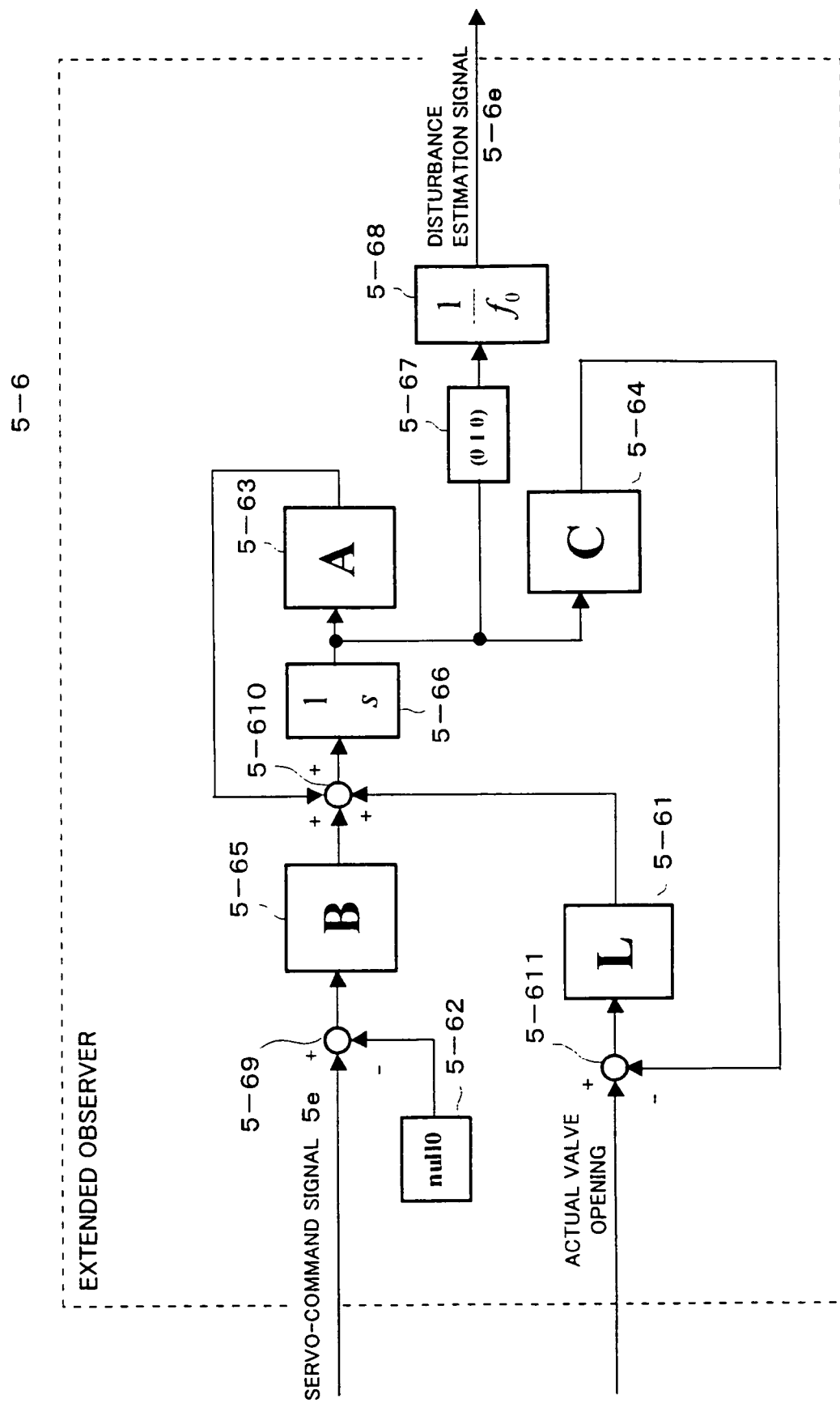
FIG. 2 is a block diagram of an extended observer of the first embodiment according to the present invention.

Now, an example of the extended observer 5-6 is described referring to FIG. 2. The extended observer 5-6 shown in FIG. 2 has a control gain 5-61 (L), a null bias compensator 5-62, a system matrix 5-63 (A) of the servo valve, an observation matrix 5-64 (C) of the servo valve, an input matrix 5-65 (B) of the servo valve, an integrator 5-66 (1/S), a matrix 5-67 (010), an amplifier (or a gain) 5-68 (1/f0), and summers 5-69, 5-610 and 5-611.

The non-linear state space model of the servo valve is expressed by Equation (1) as follows:

$$\dot{z} = 0 \times z + f \times (i - \text{null}) \quad (1)$$

wherein: "z" is servo valve position, "f" is oil cylinder constant, "i" is servo current and "null" is null bias.

The state space model (first order) for input terminal disturbance added to the servo valve is expressed by Equation (2) using free model as follows:

$$\frac{d}{dt}\begin{pmatrix} x \\ \dot{x} \end{pmatrix} = \begin{pmatrix} 0 & 1 \\ 0 & 0 \end{pmatrix}\begin{pmatrix} x \\ \dot{x} \end{pmatrix} \quad (2)$$

wherein x is input disturbance.

The state space model of the servo valve extended by the input-terminal disturbance model is expressed by Equations (3) and (4), which are derived from Equations (1) and (2), as follows:

$$\frac{d}{dt}\begin{pmatrix} z \\ x \\ \dot{x} \end{pmatrix} = \begin{pmatrix} 0 & 1 & 0 \\ 0 & 0 & 1 \\ 0 & 0 & 0 \end{pmatrix}\begin{pmatrix} z \\ x \\ \dot{x} \end{pmatrix} + \begin{pmatrix} f \\ 0 \\ 0 \end{pmatrix}(i - null0) \quad (3)$$

$$y = (1 \ 0 \ 0)\begin{pmatrix} z \\ x \\ \dot{x} \end{pmatrix} \quad (4)$$

By expressing Equations (3) and (4) in nominal values of the controlled values and shifted values from the nominal values, Equations (5) to (8) are obtained as follows:

$$\dot{x} = Ax + (B + \Delta B) \times u \quad (5)$$

$$y = Cx \quad (6)$$

Oil cylinder constant variation: $f = f_0 + \Delta f$ \quad (7)

Null bias variation: $null = null0 + \Delta null$ \quad (8)

wherein:

$f_0$ is nominal value of oil cylinder constant; $\Delta f$ is variation of oil cylinder constant; null0 is nominal null bias; $\Delta$ null is variation of null bias; and $$A = \begin{pmatrix} 0 & 1 & 0 \\ 0 & 0 & 1 \\ 0 & 0 & 0 \end{pmatrix}, B = \begin{pmatrix} f_0 \\ 0 \\ 0 \end{pmatrix}, \Delta B = \begin{pmatrix} \Delta f \\ 0 \\ 0 \end{pmatrix}, C = (1 \ 0 \ 0),$$

$$D = \begin{pmatrix} 1 \\ 0 \\ 0 \end{pmatrix}, x = \begin{pmatrix} z \\ x \\ \dot{x} \end{pmatrix}, u = i - null0, \Delta u = -\Delta null$$

The extended observer 5-6 shown in FIG. 2 is constructed based upon Equations (3) and (4). The disturbance estimation value is obtained by multiplying by the matrix 5-67 (010), which extracts the disturbance estimation signal, as shown in Equation (9):

$$\dot{\hat{x}}(A - LC)\hat{x} + Bu + Ly \quad (9)$$

wherein: x is an input terminal disturbance signal; $\dot{x}$ is a disturbance estimation value; A is a system matrix; B is an input matrix; C is an observation matrix; and L is a control gain.

The control gain 5-61 can be designed by modern control theory such as the polar assignment technique or Karman filter technique. The setting values in the null bias compensator 5-62 in the extended observer 5-6 are set the same values as the setting values in the null bias compensator 5-3 in the servo-valve control device 5.

It should be noted that the system matrix (A) 5-63 and the observation matrix (C) 5-64 are constant matrixes and do not include parameters of the model of the servo valve to be controlled. The parameters to be controlled are included only in the input matrix (B) 5-65. This is because the input terminal disturbance signal x includes modeling error of the signal to be controlled. Therefore, the system stability of the designed extended observer 5-6 is assured independent of the parameter fluctuation, as long as the order of the servo valve to be controlled does not change.

Next, the disturbance estimation value estimated by the extended observer 5-6 is multiplied by the inverse number of the nominal value of the oil cylinder constant in the amplifier (control gain) 5-68, as shown in FIG. 2. Then, the sign is changed and it is added to the servo command signal as shown in FIG. 1. Because of the feed forward pass 5-7, the input terminal disturbance can be rapidly suppressed.

By the integrator 5-66 in the extended observer 5-6, the steady state deviation between the valve opening command and the actual valve opening is assured to be zero independent of the nominal value of the oil cylinder constant.

In this embodiment, the output of the limiter 5-5, which limits the servo command signal by the upper and lower bounds, is input to the extended observer 5-6 in order to prevent a "wind-up". "Wind-up" is a phenomenon where the integrated output increases to infinity when control deviation remains a finite value due to the limitation of the operation terminal or of the actuator. The construction, which can prevent wind-ups, has an important advantage compared to ordinary integration control to the deviation between the valve opening command and the actual valve opening.

The control input decision algorithm is expressed by Equation (10):

$$i = null0 + K_P(z^* - z) - \frac{1}{f_0}\hat{x} \quad (10)$$

wherein: Kp is a proportional gain; and $z^*$ is a servo-valve position command signal.

Figure 3:
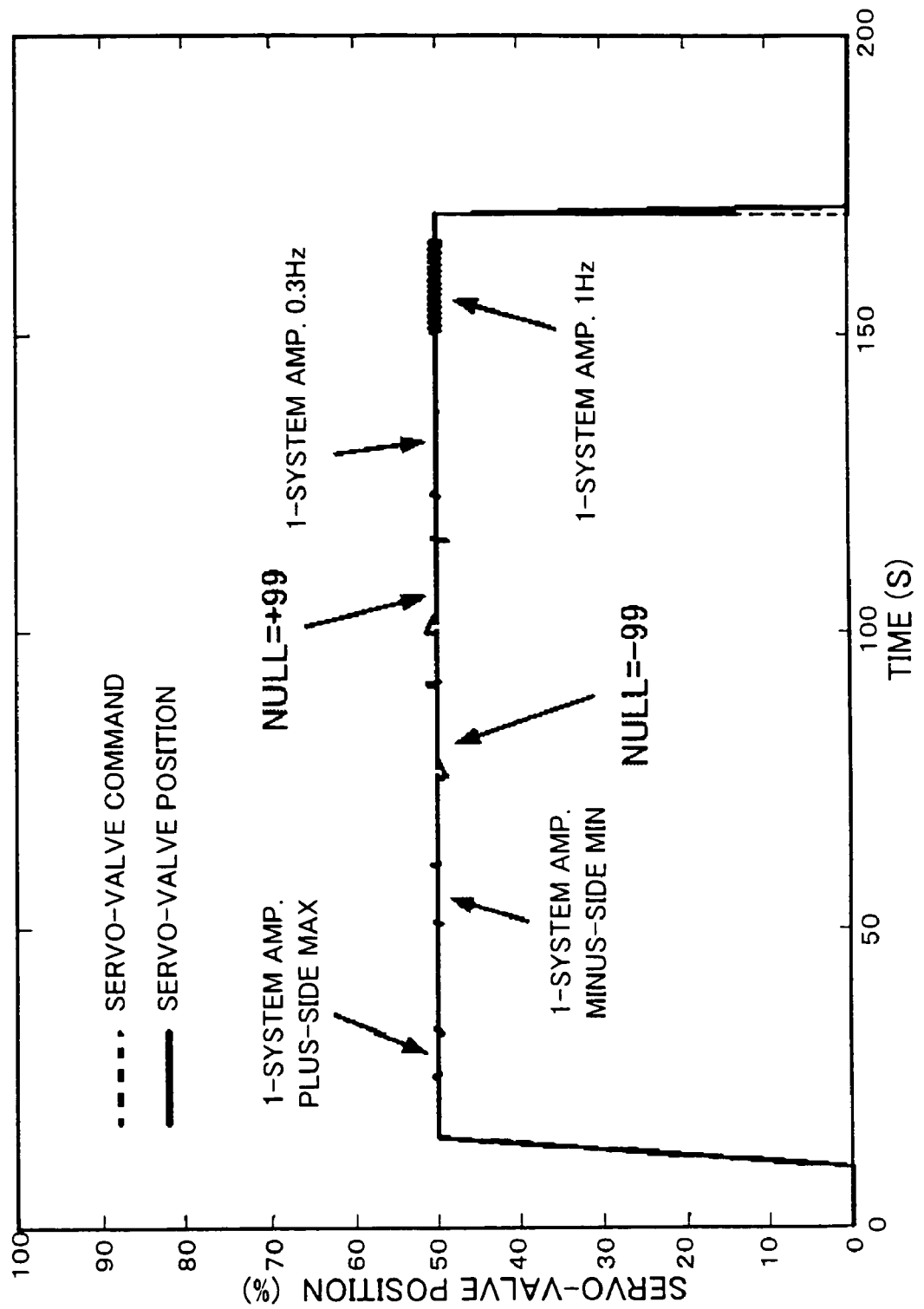
FIG. 3 is a time chart showing the servo-valve position control characteristics of the servo-valve control device of the first embodiment according to the present invention.
Figure 4:
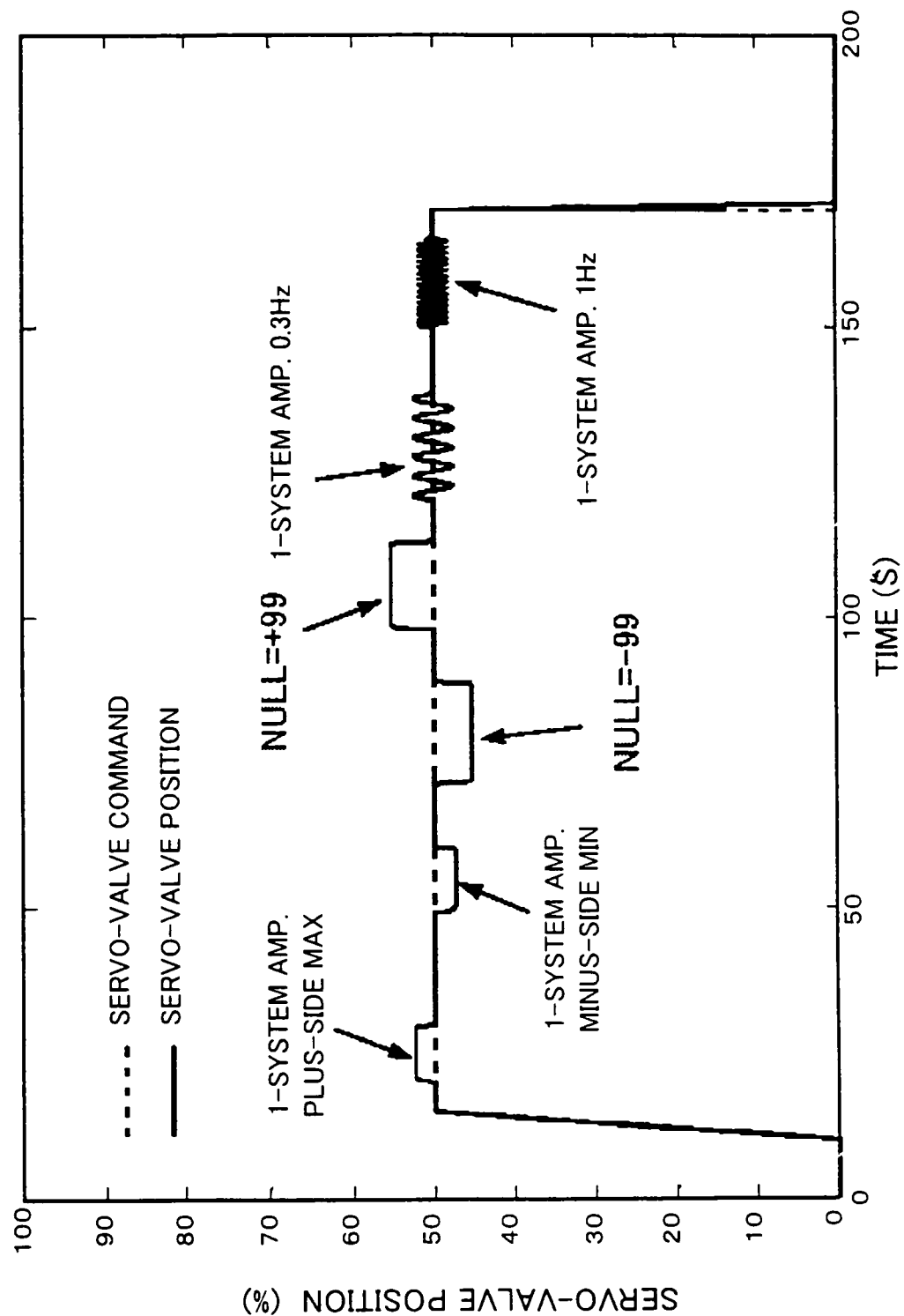
FIG. 4 is a time chart showing the servo-valve position control characteristics of the servo-valve control device of the prior art.
Figure 5:
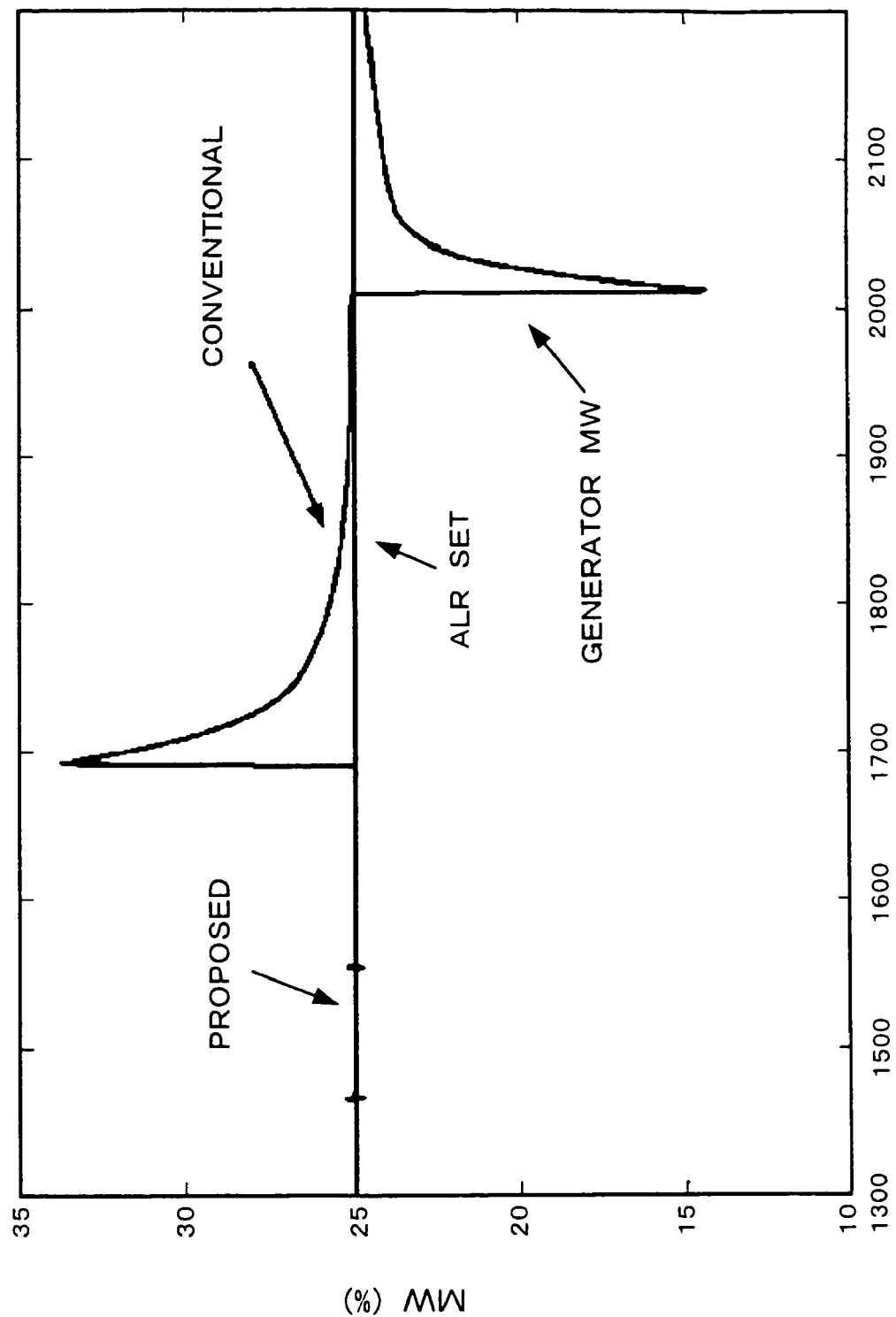
FIG. 5 is a time chart showing generator-load control characteristics of the turbine speed controller according to the present invention in comparison with the prior art.

Now, the performance of the control device of the present embodiment compared to the prior art is described referring to FIGS. 3 to 5.

Figure 14:
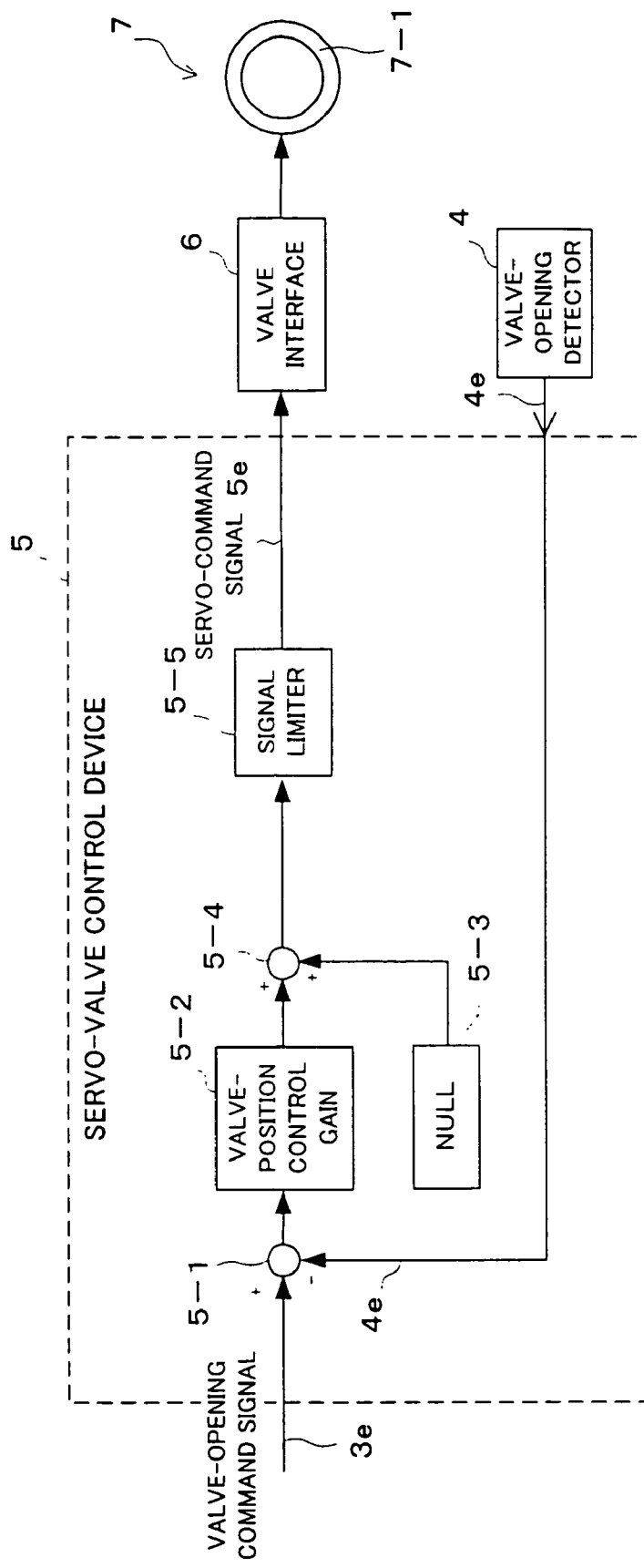
FIG. 14 is a block diagram of a servo-valve control device of the prior art.

FIG. 3 is a time chart showing the servo-valve position control characteristics of the servo-valve control device of this embodiment, which has the extended observer 5-6. FIG. 4 is a time chart showing the servo-valve position control characteristics of the servo-valve control device of the prior art shown in FIG. 14, which does not have an extended observer 5-6. The time charts shown in FIGS. 3 and 4 are both under an initial condition of a valve opening command of 50% and of an actual valve opening of 50% in stability. The disturbances such as a null bias fluctuation and a single-system power-amplifier abnormality are assumed to be added.

The comments written with arrows in FIGS. 3 and 4 denote types of the disturbances. "1-SYSTEM AMP. PLUS-SIDE MAX" means that one system out of the three systems of the power amplifiers abnormally outputs the maximum value on the positive side independent of the input. "1-SYSTEM AMP. MINUS-SIDE MIN" means that one system out of the three systems of the power amplifiers abnormally outputs the minimum value on the negative side independent of the input. "NULL=-99" means that the null bias of the servo valve abnormally changes from -5% to -99% of the maximum value of the corresponding servo current. "NULL=+99" means that the null bias of the servo valve abnormally changes from -5% to +99% of the maximum value of the corresponding servo current.

"1-SYSTEM AMP. 0.3 Hz" means that one system out of the three systems of the power amplifiers abnormally outputs a sinusoidal curve with a frequency of 0.3 Hz and amplitude of 100%, independent of the input. "1-SYSTEM AMP. 1 Hz" means that one system out of the three systems of the power amplifiers abnormally outputs a sinusoidal curve with a frequency of 1 Hz and amplitude of 100%, independent of the input.

It is to be understood by comparing FIGS. 3 and 4 that the extended observer 5-6 of the present invention quickly estimates the input disturbance added to the servo valve. The valve position fluctuation is suppressed against disturbances by the direct disturbance suppression compensation with the feed forward pass 5-7.

FIG. 5 is a time chart that shows comparison of the load control characteristics of the present invention and the prior art. This figure shows the case where one of the power amplifiers in the 3-coil servo system becomes abnormally a positive maximum value when the power generator is controlled at a constant load of 25% with the turbine speed control device.

"PROPOSED" in FIG. 5 means the load response of the device of this embodiment shown in FIG. 1. "CONVENTIONAL" means the load response of the device of prior art shown in FIG. 9. "ALR SET" means generator load command value, and "GENERATOR MW" means the generator load.

As described above, according to the control device of this embodiment, the extended observer 5-6 estimates the input terminal disturbance added on the servo valve to be controlled, based upon a mathematical model of the servo valve. Then, the servo current command is recalculated so that the estimated disturbance may be canceled. Thus, the input disturbance can be directly and remarkably suppressed.

Second Embodiment

Figure 6:
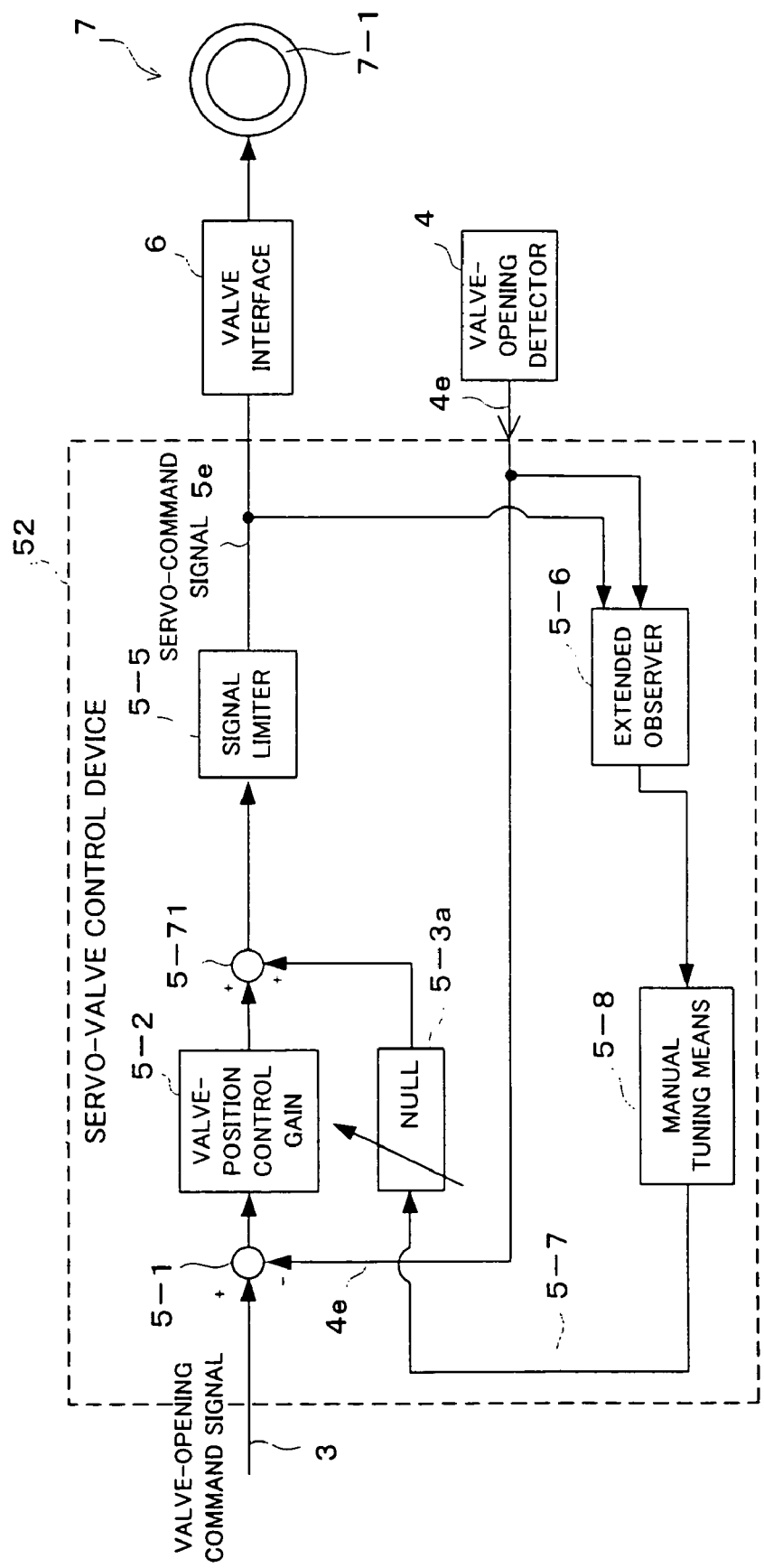
FIG. 6 is a block diagram of a servo-valve control device of a second embodiment according to the present invention.

FIG. 6 shows a servo-valve control device 52 of a second embodiment according to the present invention. The servo-valve control device 52 of this embodiment has a manual tuning means 5-8. The operator tunes and evaluates the setting values of the null bias compensator 5-3*a* by the manual tuning means 5-8, based upon the output signal from the extended observer 5-6. The operator tunes the setting values of the null bias compensator 5-3*a* so that the output of the extended observer 5-6 may become zero.

According to this embodiment, the operator evaluates the magnitude of the disturbance estimation signal of the extended observer 5-6, and decides the magnitude of deviation of the setting value of the null bias compensator 5-3*a*. Then, the null bias compensator 5-3*a* can be manually tuned, and optimal control condition can be always secured.

Third Embodiment

Figure 7:
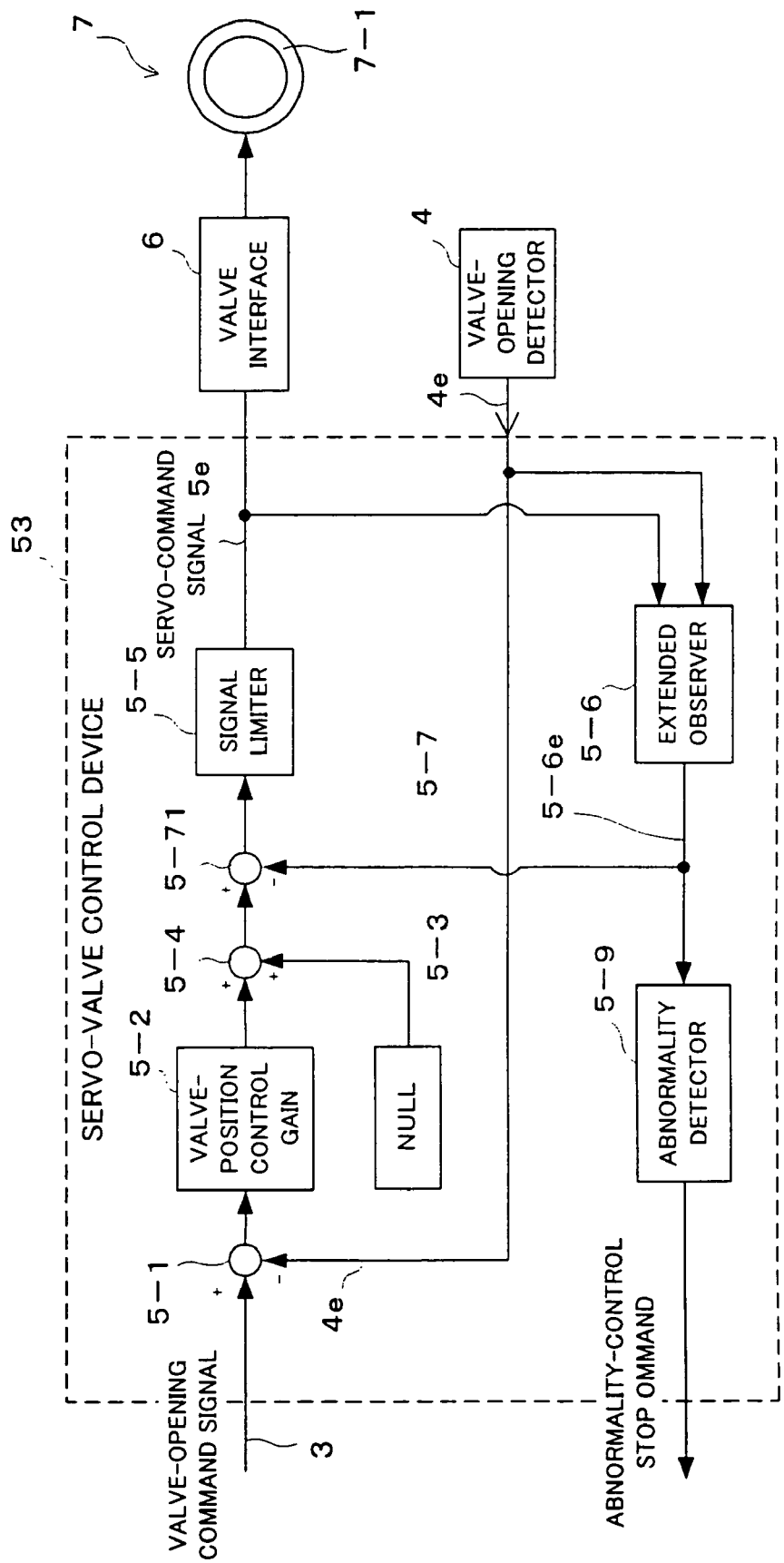
FIG. 7 is a block diagram of a servo-valve control device of a third embodiment according to the present invention.

FIG. 7 shows a servo-valve control device 53 of a third embodiment according to the present invention. The servo-valve control device 53 of this embodiment has an abnormality detector 5-9, which detects abnormality in the servo-valve control device 53 itself based upon the output signal of the extended observer 5-6. The abnormality detector 5-9 would decide a valve-opening control abnormality when, for example, the output signal of the extended observer 5-6 goes out of the range of −100 to +100%.

According to this embodiment, abnormality of the valve position control loop can be monitored and detected on-line during operation of the control, based upon the disturbance estimation signal 5-6e of the extended observer 5-6. Thus, the abnormality detector 5-9 can be used as a means for outputting appropriate command at the abnormality.

Fourth Embodiment

Figure 8:
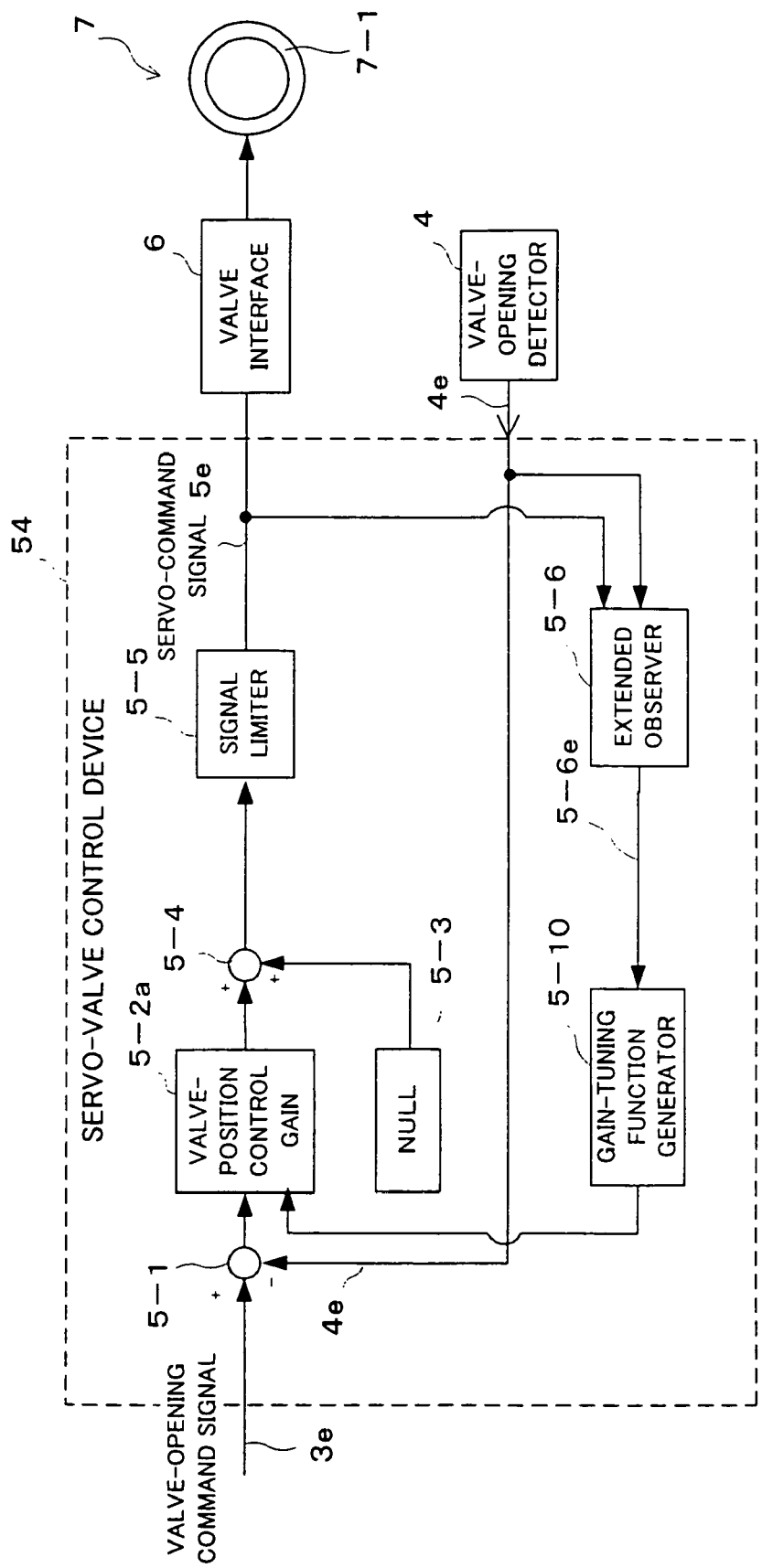
FIG. 8 is a block diagram of a servo-valve control device of a fourth embodiment according to the present invention.

FIG. 8 shows a servo-valve control device 54 of a fourth embodiment according to the present invention. The servo-valve control device 54 of this embodiment has a gain-tuning function generator 5-10. The gain-tuning function generator 5-10 tunes the variable valve-position control gain P of the proportional controller 5-2*a* based upon the output signal 5-6*e* of the extended observer 5-6. When the absolute value of the output signal of the extended observer 5-6 is larger, the variable valve-position control gain P is set larger. When the absolute value of the output signal of the extended observer 5-6 is smaller, the variable valve-position control gain P is set smaller.

The variable valve-position control gain P may not necessarily be a proportional gain, and a plurality of control parameters may be tuned in controllers.

As discussed above, according to this embodiment, control characteristics of the servo-valve control device can be improved by changing the gain of the controller 5-2*a* in response to the magnitude of the input disturbance added on the servo valve.

Fifth Embodiment

Figure 9:
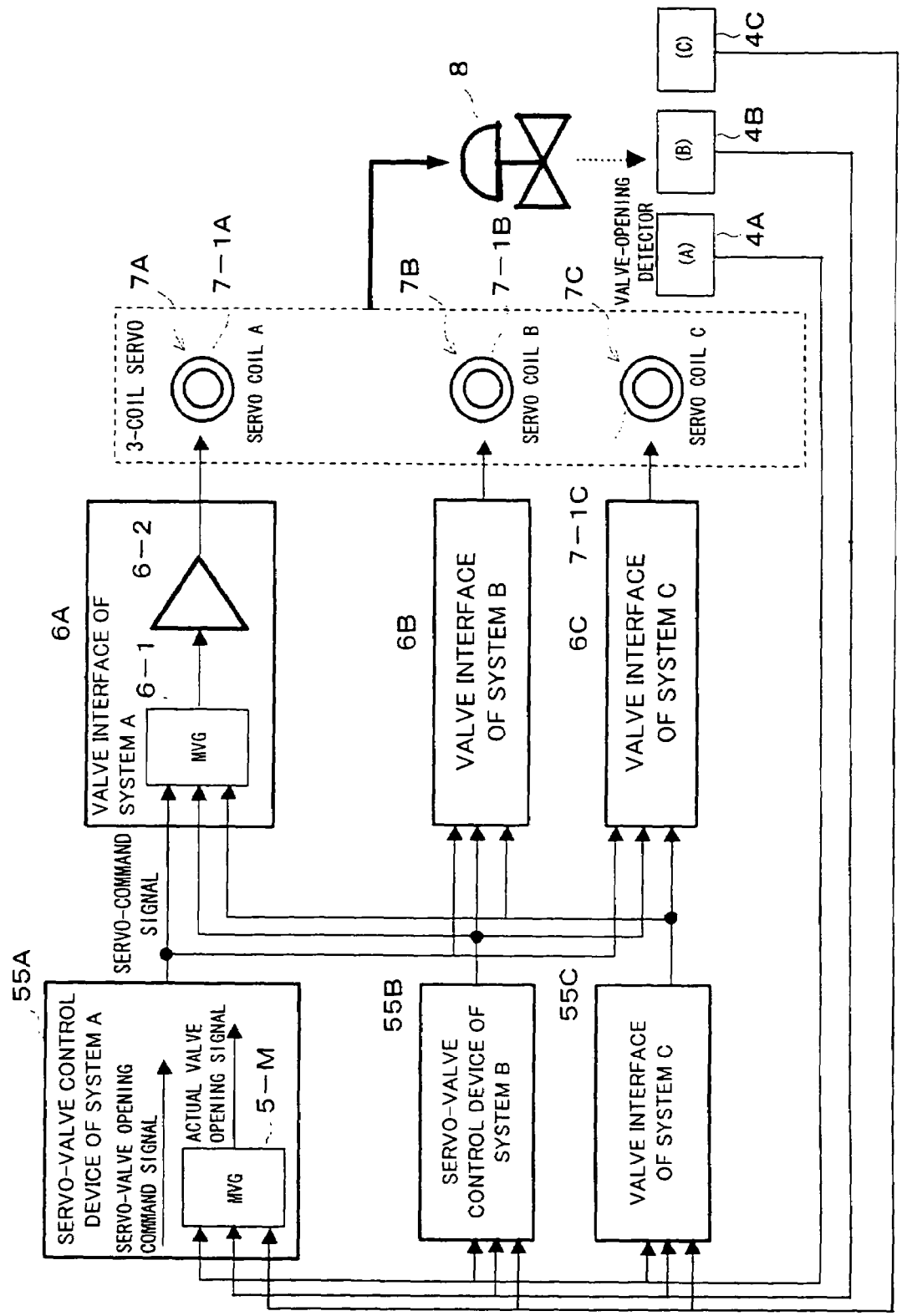
FIG. 9 is a block diagram of a 3-coil servo system of a fifth embodiment according to the present invention.
Figure 10:
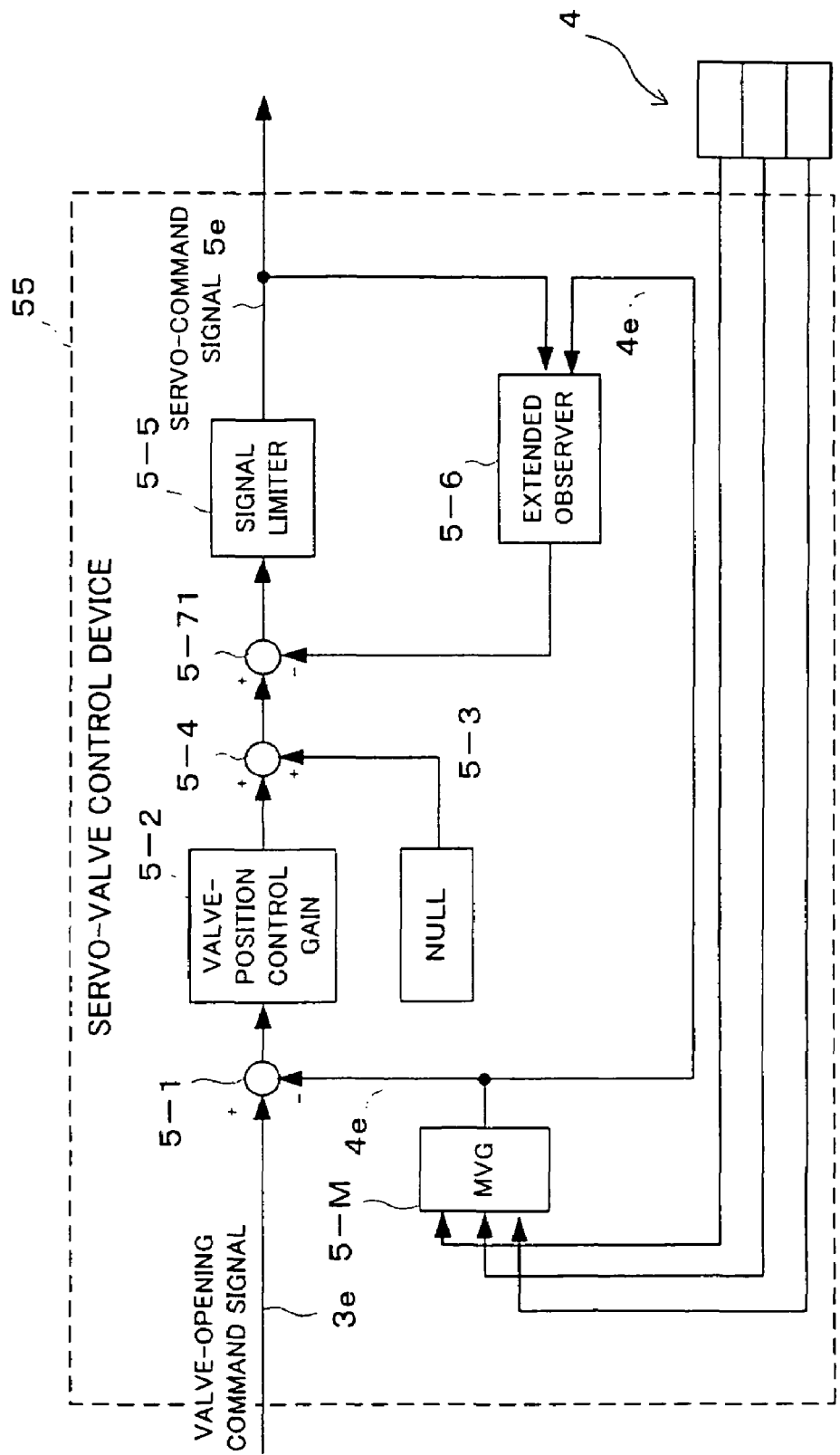
FIG. 10 is a block diagram of a servo-valve control device of the fifth embodiment according to the present invention.

FIG. 9 shows a fifth embodiment according to the present invention. This embodiment is an example where servo-valve control devices 55A, 55B and 55C are applied to a 3-coil servo system for controlling a single main-steam control valve 8. FIG. 10 shows one of the servo-valve control devices 55A, 55B and 55C, represented by "55", in detail.

In addition to the servo-valve control devices 55A, 55B and 55C, valve interfaces 6A, 6B and 6C, servo coils 7-1A, 7-1B and 7-1C, and valve-opening detectors 4A, 4B, 4C form triplex constructions of systems A, B and C. The servo-valve control devices 55A, 55B and 55C each has a middle value gate 5-M in addition to the structure of the servo-valve control device 51 shown in FIG. 1.

The actual valve opening signals from the valve-opening detectors 4A, 4B, 4C are all input to the middle value gates 5-M, and the middle value is selected to be used in the downstream. The valve interfaces 6A, 6B and 6C each have a middle value gate 6-1. The outputs of the servo-valve control devices 55A, 55B and 55C are all input to the middle value gates 6-1 of the valve interfaces 6A, 6B and 6C, and the middle value is selected to be used in the downstream.

The servo-valve control device 55 shown in FIG. 10 is similar to the servo-valve control device 51 shown in FIG. 1 added with the middle value gate 5-M. Alternatively, the other servo-valve control devices 52, 53 or 54 shown in FIGS. 6, 7 or 8 added with the middle value gate 5-M can replace the servo-valve control device 55.

Referring to FIG. 10, the middle value output from the middle value gate 5-M is input to the summer 5-1 and the extended observer 5-6. The other features are same as those shown in FIG. 1.

According to this embodiment, normal control can be continued in a case of a single system abnormality in the power amplifiers or of a single system abnormality in the valve-opening detectors, or in a case of one or two disconnection of the servo coils.

Figure 15:
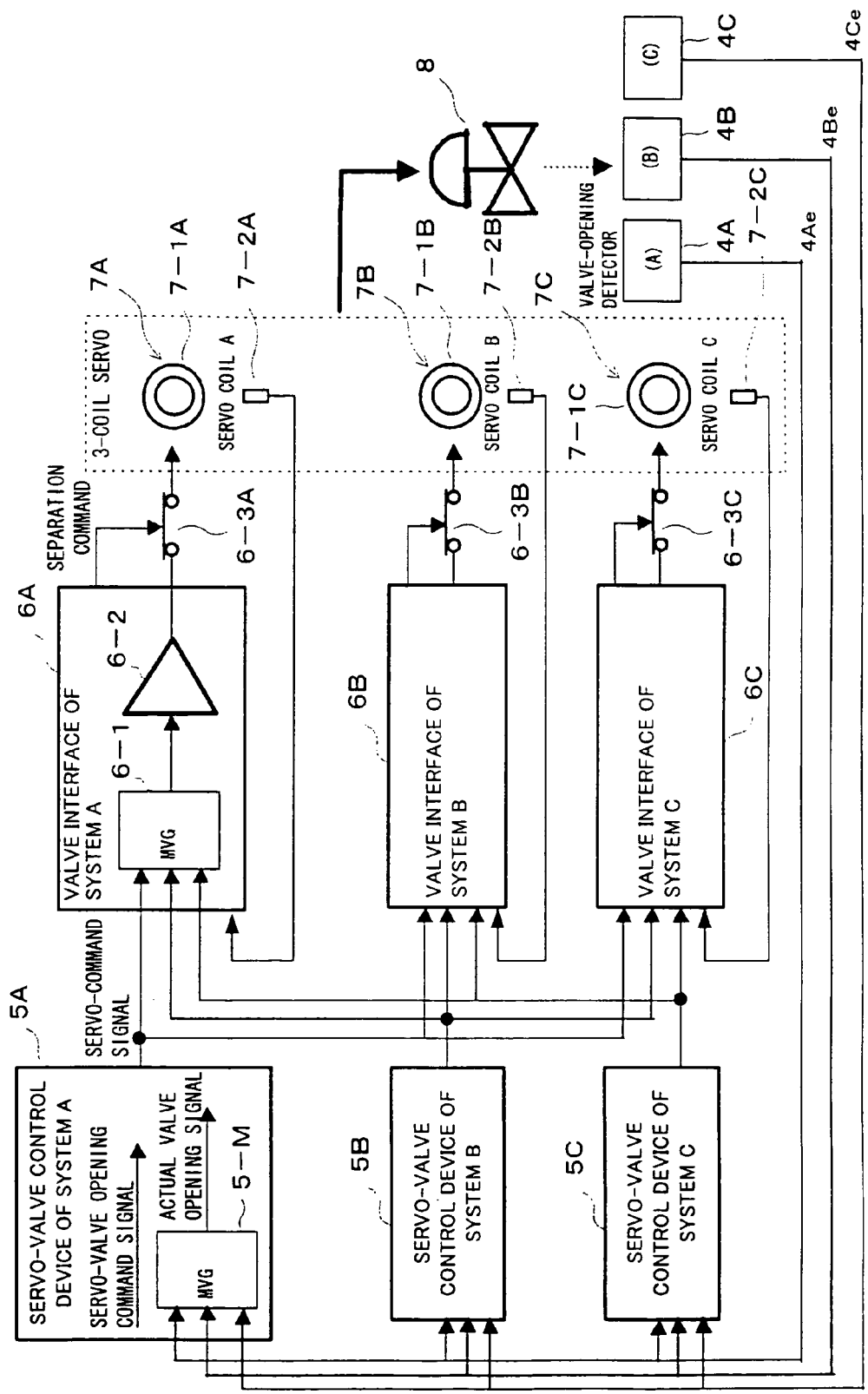
FIG. 15 is a block diagram of a 3-coil servo system of the prior art.

In the prior-art 3-coil servo system shown in FIG. 15, output separation of the power-amplifier abnormality systems or servo-coil disconnection systems is conducted with servo-current detectors 7-2A, 7-2B and 7-2C and circuit separation switches 6-3 such as relays. Thus, if the servo-valve control device 5 is simply applied to a 3-coil servo system, when a power-amplifier abnormality or a servo-coil disconnection have occurred and when the output separation is not conducted, control equivalent to normal control cannot be continued. That is because the power-amplifier abnormality and the servo-coil disconnection are equivalent to input disturbances added on the servo valve.

On the other hand, according to the embodiment shown in FIGS. 9 and 10, the extended observers 5-6 in the servo-valve control devices 55A, 55B and 55C compensate the input-terminal disturbance on the servo valve due to the power-amplifier abnormality or servo-coil disconnection, and recalculate the servo command signals. Thus, normal control can be continued without the servo-current detectors 7-2A, 7-2B or 7-2C or the circuit separation switches 6-3A, 6-3B or 6-3C shown in FIG. 15, when one system of the power amplifier 6-2 or of the valve-opening detector 55 is in an abnormal condition, or when up to two systems of the servo coils 7-1 are disconnected.

As discussed above, according to this embodiment, the extended observers of the control devices compensate the disturbance at the input terminal added on the valve-position control loop. Thus, normal control can be continued, without means for detecting power-amplifier current or means for separating the power-amplifier output.

Sixth Embodiment

Figure 11:
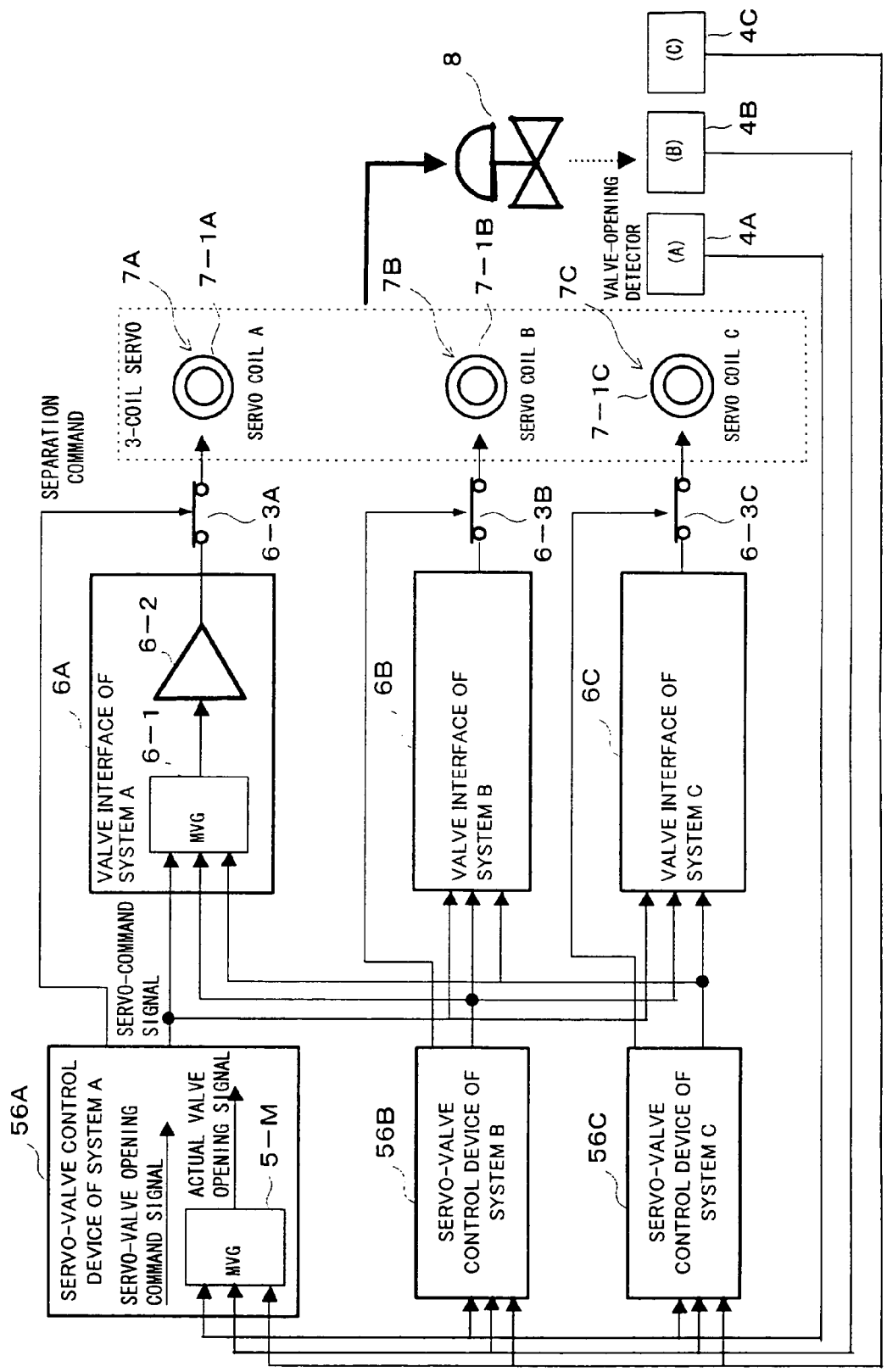
FIG. 11 is a block diagram of a 3-coil servo system of a sixth embodiment according to the present invention.

FIG. 11 shows a sixth embodiment according to the present invention. This embodiment is a second example where servo-valve control devices 55A, 55B and 55C are applied to a 3-coil servo system for controlling a single main-steam control valve 8. Compared with the example shown in FIG. 9, circuit separation switches 6-3A, 6-3B and 6-3C are added to the output lines of the valve interfaces 6A, 6B and 6C. Furthermore, abnormal-system separation logic is added for outputting separation commands to the circuit separation switches 6-3A, 6-3B and 6-3C.

In this embodiment, the power amplifier in abnormal condition is decided by software, based upon the outputs of the extended observers 5-6 in the servo-valve control devices 56A, 56B and 56C. Then, a circuit separation command is output to the power amplifier in abnormal condition, and the output circuit is separated by the circuit separation switches 6-3A, 6-3B or 6-3C. Thus, normal control can be continued without using the servo-current detectors 7-2A, 7-2B and 7-2C of the prior art (See FIG. 15), when up to two systems of the power amplifiers are in abnormal condition.

Figure 12:
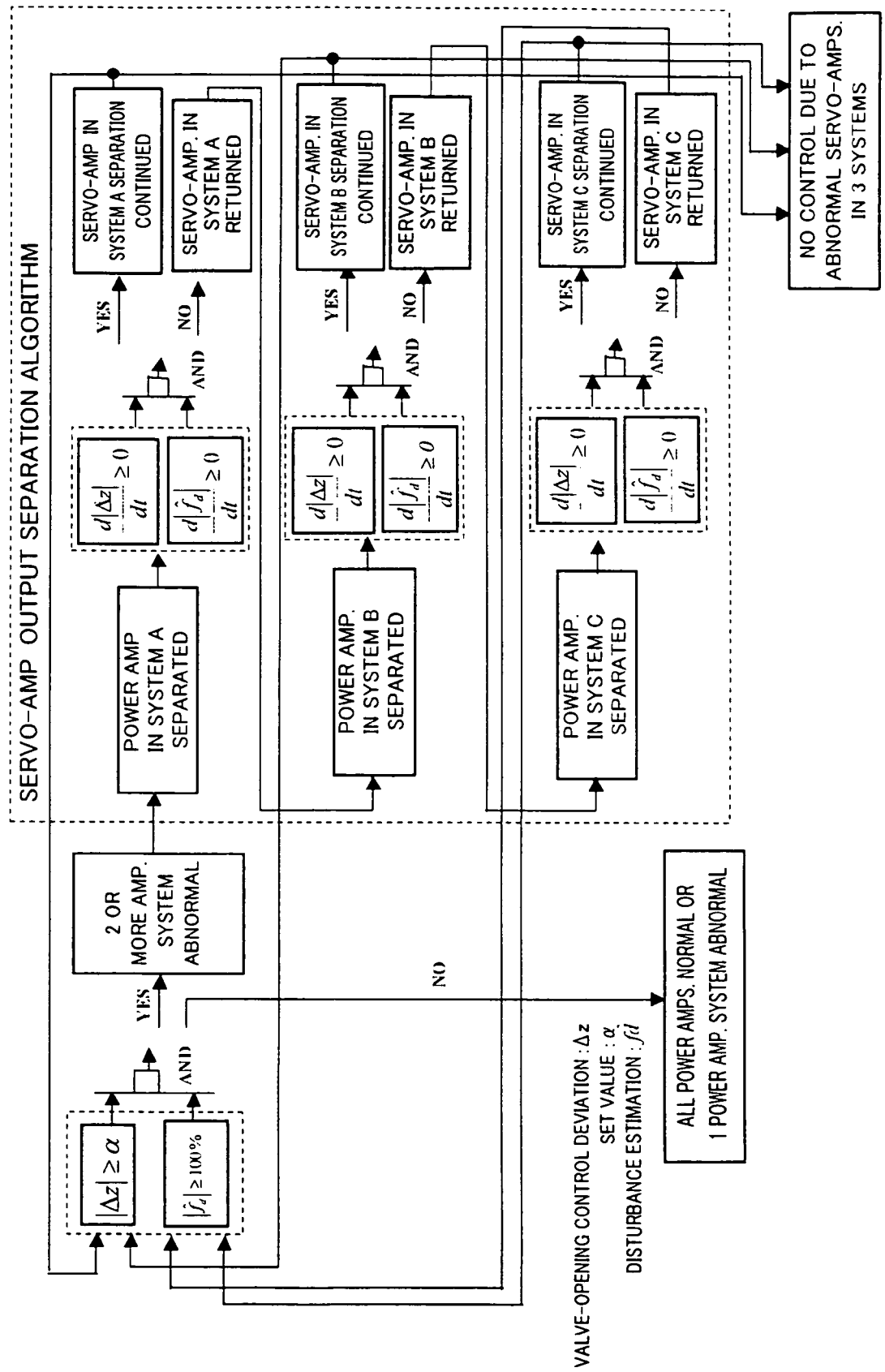
FIG. 12 is a flow chart showing method of detecting an abnormal power amplifier system by software and separating the power amplifier output in the 3-coil servo system of the sixth embodiment according to the present invention.
Figure 13:
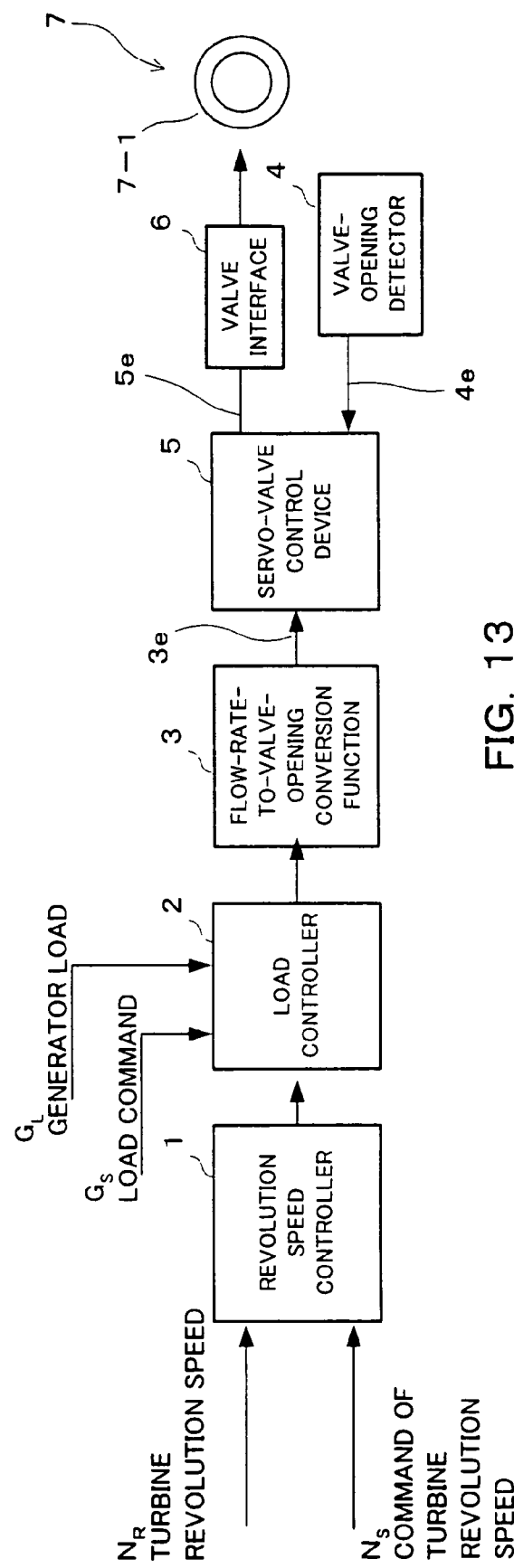
FIG. 13 is a block diagram showing general functions of a typical turbine speed controller of the prior art.

FIG. 12 shows an example of a logic circuit of deciding the power amplifier in abnormal condition and of separating the abnormal system. The logic circuit of deciding the power amplifier in abnormal condition utilizes the output signals of the extended observers 5-6 in the servo-valve control devices 56A, 56B and 56C shown in FIG. 11.

Referring to FIG. 12, the absolute value of the disturbance estimation, which is an output of the extended observers 5-6, and the absolute value of the valve-opening control deviation are input to a first abnormality decision means 60. When the output of the extended observers 5-6 exceeds the range of −100 to +100%, and the absolute value of the valve-opening control deviation exceeds a stipulated value, the "AND" condition is satisfied. In such a condition, it is decided that two or more power amplifier systems are in abnormal condition. Then, the abnormal power amplifier system is identified by executing the detecting logic with software.

The detecting logic which identifies the power amplifier in abnormal condition separates the outputs of Systems A, B and C, sequentially. When a power amplifier is separated, the change rates of the output of the extended observers 5-6 and of the valve opening control deviation are input to a second decision means 61. When both change rates are zero or positive, the "AND" condition is satisfied, and the power amplifier of the particular system is decided to be in abnormal condition. In such a case, the separation operation of the servo amplifier of the system is continued.

In the second decision means 61, if at least one of the change rates of the output signal of the extended observers 5-6 or of the valve opening control deviation is negative, the "AND" condition is satisfied, and the system is decided to be in normal condition. Then, the servo amplifier of the system returns.

The operation described above is conducted sequentially for three systems. Thus, the system with the abnormal power amplifier can be identified without detecting the servo current. Then, normal control can be continued even when power amplifiers of two systems are in abnormal condition.

In the example shown in FIG. 12, "AND" condition of the output of the extended observers 5-6 and the valve opening control deviation Δz is used. However, in another example, only the extended observers 5-6 may be monitored.

According to this embodiment, the systems with power amplifiers in abnormal condition are identified by software based upon the outputs of the extended observers 5-6, and the output of the power amplifiers in abnormal condition are separated. Thus, in a case of up to two systems of the power amplifiers in abnormal conditions, normal control can be continued without direct detection of the servo current.

Numerous modifications and variations of the present invention are possible in light of the above teachings. It is, therefore, to be understood that, within the scope of the appended claims, the present invention can be practiced in a manner other than as specifically described herein.

What is claimed is:

1. A servo-valve control device for controlling servo-valve opening, so that the servo-valve opening may follow a target by inputting signals of a servo-valve opening target value and of an actual servo-valve opening, the control device comprising:
   a controller, which is constructed to receive a signal of difference between the servo-valve opening target value and the actual servo-valve opening, and to generate a servo command signal for driving the servo valve;
   an extended observer, which is constructed to receive the actual valve opening signal and the servo command signal, and to estimate an input-terminal disturbance signal added on the servo valve; and
   a modification part, which is constructed to modify the servo command signal by subtracting the estimated input-terminal disturbance signal output from the extended observer, from the servo command signal.

2. The servo-valve control device according to claim 1, further comprising a signal limiter which is constructed to receive the servo command signal and to limit the servo command signal within a pre-determined range.

3. The servo-valve control device according to claim 1, wherein the controller includes a null bias compensator which is constructed to add a compensation signal to the servo command signal for compensating a null bias contained in the servo valve.

4. The servo-valve control device according to claim 1, wherein the extended observer is constructed to model the servo valve using a system matrix and an observer matrix which are independent of characteristic parameters of the servo valve.

5. The servo-valve control device according to claim 1, further comprising an abnormality detector for detecting an abnormal condition of the servo-valve control device based upon output of the extended observer.

6. A servo-valve control device for controlling servo-valve opening, so that the servo-valve opening may follow a target by inputting signals of a servo-valve opening target value and of an actual servo-valve opening, the control device comprising:
a controller, which is constructed to receive a signal of difference between the servo-valve opening target value and the actual servo-valve opening, and to generate a servo command signal for driving the servo valve;
an extended observer, which is constructed to receive the actual valve opening signal and the servo command signal, and to estimate an input-terminal disturbance signal added on the servo valve; and
a function generator, which is constructed to tune at least one control parameter of the controller based upon the disturbance estimation signal from the extended observer.

7. The servo-valve control device according to claim 6, wherein the controller includes a null bias compensator which is constructed to add a compensation signal to the servo command signal for compensating a null bias contained in the servo valve.

8. The servo-valve control device according to claim 6, wherein the extended observer is constructed to model the servo valve using a system matrix and an observer matrix which are independent of characteristic parameters of the servo valve.

9. A servo-valve control device for controlling servo-valve opening, so that the servo-valve opening may follow a target by inputting signals of a servo-valve opening target value and of an actual servo-valve opening, the control device comprising:
a controller, which is constructed to receive a signal of difference between the servo-valve opening target value and the actual servo-valve opening, and to generate a servo command signal for driving the servo valve;
an extended observer, which is constructed to receive the actual valve opening signal and the servo command signal, and to estimate an input-terminal disturbance signal added on the servo valve;
a null bias compensator which is constructed to add a compensation signal to the servo command signal for compensating a null bias contained in the servo valve; and
a tuner for tuning at least one setting value of the null bias compensator, based upon the disturbance estimation signal from the extended observer.

10. The servo-valve control device according to claim 9, wherein the extended observer is constructed to model the servo valve using a system matrix and an observer matrix which are independent of characteristic parameters of the servo valve.

11. A servo-valve control system for controlling a servo valve, the control system comprising:
(a) a triplex system of valve-opening detectors for obtaining actual valve opening signals of the servo valve;
(b) a triplex system of servo-valve control devices each including:
a first middle value gate for selecting a middle value of the actual valve opening signals of the servo valve;
a controller, which is constructed to receive a signal of difference between the servo-valve opening target value and the middle value of the actual servo-valve opening, and to generate a servo command signal for driving the servo valve;
an extended observer, which is constructed to receive the actual valve opening signal and the servo command signal, and to estimate an input-terminal disturbance signal added on the servo valve; and
a modification part, which is constructed to modify the servo command signal by subtracting the estimated input-terminal disturbance signal output from the extended observer, from the servo command signal;
(c) a triplex system of valve interfaces each including:
a second middle value gate for selecting a middle value of the servo command signals from the servo-valve control devices; and
a power amplifier which is constructed to amplify the servo command signal from the second middle value gate to drive one of the servo valves; and
(d) a triplex system of servo coils for driving the servo valves with current from the valve interfaces.

12. The servo-valve control device according to claim 11, wherein the extended observer is constructed to model the servo valve using a system matrix and an observer matrix which are independent of characteristic parameters of the servo valve.

13. A servo-valve control system for controlling a servo valve, the control system comprising:
(a) a triplex system of servo-valve control devices each including:
a controller, which is constructed to receive a signal of difference between the servo-valve opening target value and the actual servo-valve opening, and to generate a servo command signal for driving the servo valve;
an extended observer, which is constructed to receive the actual valve opening signal and the servo command signal, and to estimate an input-terminal disturbance signal added on the servo valve; and
a modification part, which is constructed to modify the servo command signal by subtracting the estimated input-terminal disturbance signal output from the extended observer, from the servo command signal;
(b) a triplex system of valve interfaces each including a power amplifier which is constructed to amplify one of the servo command signals from the servo-valve control devices to drive one of the servo valves;
(c) a triplex system of servo coils for driving the servo valves with current from the valve interfaces;
(d) an abnormality decision part for deciding that at least two valve interfaces are abnormal when all of the input-terminal disturbance signals are out of a predetermined range; and
(e) a detecting logic for separating outputs of the power amplifier sequentially, based upon operation of the abnormality decision part, and for subsequently detecting abnormal power amplifier system based upon change rate of the input-terminal disturbance signal output from the extended observer.

14. The servo-valve control device according to claim 13, wherein the extended observer is constructed to model the servo valve using a system matrix and an observer matrix which are independent of characteristic parameters of the servo valve.

15. A servo-valve control system for controlling a servo valve, the control system comprising:
(a) a triplex system of servo-valve control devices each including:

a controller, which is constructed to receive a signal of difference between the servo-valve opening target value and the actual servo-valve opening, and to generate a servo command signal for driving the servo valve;

an extended observer, which is constructed to receive the actual valve opening signal and the servo command signal, and to estimate an input-terminal disturbance signal added on the servo valve; and a function generator, which is constructed to tune at least one control parameter of the controller based upon the disturbance estimation signal from the extended observer;

(b) a triplex system of valve interfaces each including a power amplifier which is constructed to amplify one of the servo command signals from the servo-valve control devices to drive one of the servo valves;

(c) a triplex system of servo coils for driving the servo valves with current from the valve interfaces;

(d) an abnormality decision part for deciding that at least two valve interfaces are abnormal when all of the input-terminal disturbance signals are out of a predetermined range; and (e) a detecting logic for separating outputs of the power amplifier sequentially, based upon operation of the abnormality decision part, and for subsequently detecting abnormal power amplifier system based upon change rate of the input-terminal disturbance signal output from the extended observer.

16. The servo-valve control device according to claim 15, wherein the extended observer is constructed to model the servo valve using a system matrix and an observer matrix which are independent of characteristic parameters of the servo valve.

* * * * *